United States Patent [19]

Mock

[11] Patent Number: 5,664,034
[45] Date of Patent: Sep. 2, 1997

[54] LIGHTWAVE COMMUNICATION MONITORING SWITCH

[75] Inventor: Joel Leslie Mock, Norcross, Ga.

[73] Assignee: Lucent Technologies Inc., Murray Hill, N.J.

[21] Appl. No.: 653,373

[22] Filed: May 21, 1996

[51] Int. Cl.⁶ .................................................. G02B 6/26
[52] U.S. Cl. .................................. 385/16; 385/15; 385/22; 385/25; 385/33
[58] Field of Search .............................. 385/15, 16, 17, 385/20, 21, 22, 24, 25, 26, 27, 31, 34

[56] References Cited

U.S. PATENT DOCUMENTS

| | | | |
|---|---|---|---|
| 4,239,330 | 12/1980 | Ashkin et al. | 385/22 X |
| 4,378,144 | 3/1983 | Duck et al. | 385/25 X |
| 4,441,785 | 4/1984 | Petrozello | 385/25 X |
| 4,626,065 | 12/1986 | Mori | 385/25 X |
| 4,753,501 | 6/1988 | Battle | 385/25 X |
| 4,848,867 | 7/1989 | Kajioka et al. | 385/25 X |
| 4,896,935 | 1/1990 | Lee | 385/25 X |
| 4,946,236 | 8/1990 | Dautartas et al. | 385/25 X |
| 5,015,056 | 5/1991 | Yamaguchi et al. | 385/25 X |
| 5,031,994 | 7/1991 | Emmons | 385/16 X |
| 5,157,745 | 10/1992 | Ames | 385/26 |
| 5,278,692 | 1/1994 | Delapierre | 385/16 X |
| 5,329,392 | 7/1994 | Cohen | 359/124 |
| 5,463,704 | 10/1995 | Ziebol | 385/22 |

FOREIGN PATENT DOCUMENTS

| | | | |
|---|---|---|---|
| 58-72108 | 4/1983 | Japan | 385/25 X |
| 62-258408 | 11/1987 | Japan | 385/25 X |
| 63-204219 | 8/1988 | Japan | 385/25 |

*Primary Examiner*—Brian Healy

[57] ABSTRACT

An optical switch device has a plurality of fixed optical fiber terminations supported in a fixed array, and a terminated fiber movable by means of a stepping motor into registry with each of the terminations. Opposite the fixed array is a second array of optical devices oriented such that each termination defines a unique light path with each of the optical devices, with the light paths thus formed being parallel to each other.

25 Claims, 3 Drawing Sheets

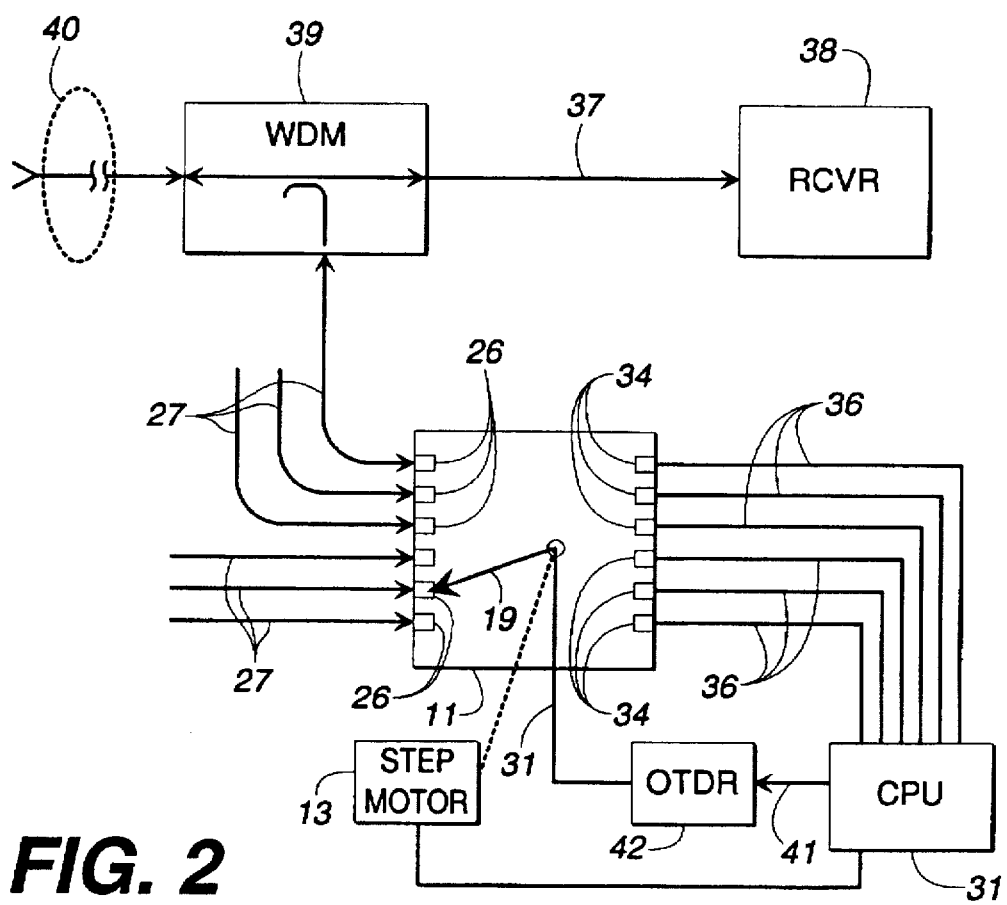
FIG. 2
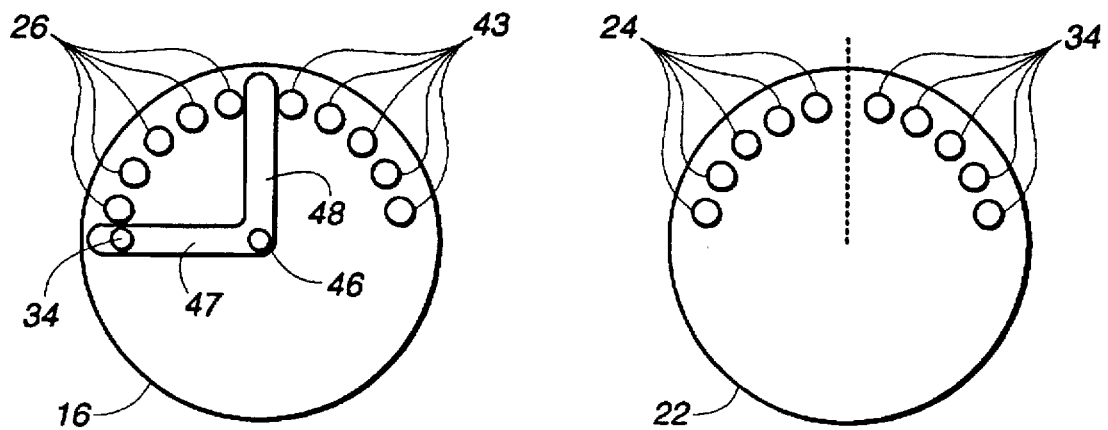
FIG. 3A  FIG. 3B

ID=5,664,034

LIGHTWAVE COMMUNICATION MONITORING SWITCH

FIELD OF INVENTION

This invention relates to fiber optic communication systems and, more particularly, to a method and apparatus for monitoring the transmission characteristics of such systems.

BACKGROUND OF THE INVENTION

In the telecommunications field, optical fibers and optical fiber cables are becoming, or have become, the transmission media of choice, primarily because of the tremendous bandwidth capabilities and low loss of such fibers.

Unfortunately, optical fibers, themselves, are quite delicate and can be easily broken or cracked to the extent that the signal transmission characteristics of the fiber are impaired. Further, when numerous fibers are contained in a cable, they are subject to stresses and strains when the cable is laid, especially when it is pulled or sharply bent. To prevent such potential damages, cables have been designed to allow pulling and bending thereof without unduly stressing the individual fibers contained within the cable. However, even in such cables, the fibers can be damaged by storms, rodent burrowing, shifting earth, or by accidents during excavation and laying, as well as by subsequent digging, as with a backhoe, in the area of the laid cable. Aerial mounted or strung cables are likewise often subject to severe stresses, primarily from storms and the like.

In telecommunication systems, the amount of optical signal traffic typically carried by just one pair of fibers in a cable can generate thousands of dollars per minute for the operator. It follows, therefore, that there is a compelling need for monitoring an optical fiber telecommunication system in order to ascertain the occurrence of an event, or predict the occurrence of an event which impairs signal transmission on a fiber and, equally important, to ascertain the location within the system of the event. Inasmuch as every minute of down time for a fiber can result in considerable monetary loss, the elapsed time involved in precisely locating the event should be minimized as much as possible.

There have been numerous arrangements proposed for monitoring an optical fiber signal transmission system, with elapsed time from occurrence of the event to precise location of the fault ranging from five minutes to seventeen hours, for example. In general, the emergency response procedure is as follows. When an alarm sounds at a control center, the operators are made aware that there is a problem, i.e., event somewhere in the network. After a verification of the integrity and operation of the transmission equipment, a conclusion is reached that the problem is with the cable, and an emergency crew is dispatched in the general direction of the fault. The crew is usually, or should be, equipped with an optical time domain reflectometer (OTDR), a test instrument that generates its own optical signal, launches it into the fiber, and measures the elapsed time of reception for the signal reflection from the fault. The elapsed time affords a measurement of distance from the reflectometer to the fault. The crew connects the OTDR to the cable, hopefully in the vicinity of the fault or event, and obtains a reading of the optical distance to the fault. With the aid of a map of the network, the crew can then precisely determine the geographic location of the fault or event. A typical cable break can take hours to locate using the foregoing procedures, and as a consequence, emphasis has been on reducing this elapsed time to a minimum.

One proposed system, the Fiber Check 5000 of Photon Kinetics, as shown in a 1001 marketing brochure, is a sophisticated monitoring and test system utilizing three basic components, a control center, a plurality of "acquisition units" and a plurality of optomechanical switches, all of which are fixed in place throughout the system. The system controller is a CPU or computer having the capability of an optical time domain reflectometer and of maintaining a data base describing the route of each cable and fiber identification. Each acquisition unit, generally located in a central office, exchange, or the like, is functionally equivalent to an OTDR, with its test results being communicated to the CPU via modem. When an event occurs, the CPU can page the various acquisition units until the fault is located. The OTDR function enables the acquisition unit in combination with the CPU to pinpoint the precise location of the event, and the electro-mechanical switches, located with the acquisition unit, make it possible to test each optical fiber in the cable at the event site, or at the acquisition site closest thereto, to ascertain which one or ones are faulty. Such a system is capable of rapid location of a fault or other event, however, it relies heavily on a large number of fixed components essential to its fault detection, fault location and monitoring functions.

Present day monitoring and fault location systems necessarily include some means for testing individual fibers in order to ascertain exactly which fiber or fibers have a fault, such as a break, and such testing is generally made possible through the use of light guide cross-over switches. An example of such a system for testing individual fibers is disclosed in U.S. Pat. No. 5,329,392 of Cohen, wherein the apparatus for switching an OTDR among several individual fibers is shown. In the Cohen system, a monitoring component is placed between the external optical fibers portion of a fiber optic terminal system and the internal fibers within a central office. The monitoring component consists of planar "main" waveguides formed on a substrate which connect to the individual fibers. Monitor waveguides are connected, by means of directional couplers, to individual monitoring devices. In addition, OTDR signals are applied to the main waveguides by means of wavelength division multiplexors (WDM), which are connected through a 1×N optical switch to the OTDR, and the output of the waveguide component is connected through a M×N cross connect switch to the external fibers leaving the central office.

There are numerous arrangements in the prior art for switching among optical fibers, to achieve M×N switching, where M and N=1,2,3, - - - . One preferred switching system is the so-called moving fiber switch, which utilizes external forces to change the location of the fibers within the switch. A switch of this type is shown and described in U.S. Pat. No. 4,946,236 of Dantartas, et al., which functions as 1×2, 2×1, 2×2 switch. In that switch, the fibers are physically moved by means of magnetic forces to one of two positions, thereby achieving cross connection. A more versatile switch structure having a 1×N capability is shown in U.S. Pat. No. 4,986,935 of Lee. In that switch, an array of N fixed fibers is arranged in a semi-circle around a rotatable member having a single fiber mounted therein and a pivot axis aligned along the central axis of the semi-circle. The rotatable member is rotated by a stepping motor and the angular orientation of the fixed fibers is such that the single fiber is optically aligned with any selected one of the fixed fibers by means of the stepping motor. In order to assure adequate signal coupling, appropriate lenses on the ends of the fibers are used to expand or to collimate the light. As a consequence, the single fiber is switched to the desired fixed fiber upon proper command to the stepping motor. Such a 1×N switch is suitable for use, for example, with the arrangement of the Cohen patent for switching the OTDR signal to the desired waveguide for testing.

From the foregoing, it can be appreciated that the switch arrangements of the prior art as used in fiber monitoring and testing, are limited simply to switching among the various fibers in order to connect the monitoring apparatus thereto. Further, it is still necessary in prior art systems that the monitoring be performed by fixed elements strategically located throughout the system. OTDR based remote fiber testing systems (RFTS) generally require approximately three minutes for trace acquisition and processing per fiber. Thus, a worst case scenario for a twenty-four fiber cable test is seventy-two minutes, which, as pointed out heretofore, can result in considerable lost revenue. Most RFTS systems that are linked with transmission system performance hardware must be adapted to the protocols of each manufacturer's proprietary system, which is especially undesirable from an economic standpoint. Independent and distributed surveillance architecture is much to be preferred. Typical commercially available RFTS are based on centralized dam acquisition and processing platforms, whereas a distributed surveillance architecture allows greater flexibility and is more fault tolerant.

SUMMARY OF THE INVENTION

The present invention is an electro-mechanical optical switch which, in addition to performing a basic switching function such as that performed by the switch in the aforementioned Cohen patent, also functions, or is capable of functioning, as a simultaneous monitor of the unaccessed fixed switch ports. In a first illustrative embodiment of the invention the switch, in a 1×N configuration, comprises an array of fixed fibers supported on a plate and extending therethrough. Preferably, each of the fibers is terminated in a Grin-rod lens which collimates the light emerging from the fiber end. Adjacent to the support plate is a movable armature which supports a single common fiber that is preferably terminated in a Grin-rod lens which creates, in effect, an expanded and/or collimated fiber light wave entrance, or exit. Thus, the end of the common fiber is capable of capturing the collimated light beam emerging from the fiber opposite which the common fiber is positioned. A stepping motor activates and moves the armature so that the common fiber can be moved from a home position to a position immediately opposite one of the fibers in the array in steps across the entire array. Thus, each fiber, in turn, can be optically connected to the common fiber, and optical energy can be extracted from each of the fixed fibers or launched thereon.

Directly opposite the support plate and its fiber array and spaced therefrom is a second support plate having mounted therein a plurality of light devices such as photodiodes arrayed in a configuration substantially identical to the array of fixed fiber so that each photo-diode in its array is aligned with a corresponding fixed fiber. Thus, when the armature is in its home or reset position, for example, the light energy in each of the fixed fibers impinges upon its corresponding photo-diode. The outputs of the photo-diodes may be connected to any of a number of possible components, such as, for example, power measuring circuitry, a central processor, or other types of monitoring arrangements. In addition, as is shown and described in greater detail in U.S. patent application Ser. No. 08/651,945, pending, of Joel Mock, filed concurrently herewith, the switch can function as a real time surveillance and monitoring system in its basic configuration, and can be modified to perform numerous tasks in a variety of fiber monitoring and fault locations arrangements. For example, in some applications, some or all of the photo-diodes can be replaced with other types of light devices such as, for example, light emitting diodes, laser diodes, or other light sources or detectors or appropriately terminated optical fibers. The disclosure of application Ser. No. 08/651,945, pending, is incorporated by reference herein.

In the basic configuration of the switch of the invention, when the light transmission system is functioning properly, light is present in each of the fixed fibers and, therefore, impinges on the corresponding photo-detector. The switch thus provides, simultaneously and continuously, a suitable indication that the cable and the fibers therein are functioning properly. When a failure occurs in a fiber, it will immediately be indicated by a loss of signal in the corresponding photo-detector. The stepping motor can then be stepped to place the common fiber opposite the fiber that has lost signal and a locating signal, for example, can then be launched on that fiber. Such an arrangement is shown and described in greater detail in the aforementioned Mock application Ser. No. 08/651,945, pending, filed concurrently herewith.

In a modification of the invention just described, the light devices, such as the photo-detectors are mounted on their support plate at a slight angle to the light paths from the fixed fibers, such as, for example, three degrees (3°) so that the light from the fixed fibers impinging on the faces thereof is not reflected directly back along the light path.

Another modification of the embodiment of the invention described in the foregoing is a light source mounted on the armature collinear with the common fiber end and the light path, and directed toward the photo-detectors. The light source is aligned and collimated, or optically shrouded or shielded, so that the optical energy emanating therefrom falls on only one photo-detector per switch position. This light source makes it possible to test each switch position, including the photo-detectors and also any associated circuitry and components connected thereto. Thus, for any switch position other than the reset or home position, the light path from the fixed fiber to the photo-detector is blocked, and the light source can be tamed on to test the receiving, i.e., photo-detector or photo-diode, circuitry.

The switch of the invention can be adapted for use in a number of different monitoring systems, depending upon the particular architecture of the monitoring system or of the transmission system, or both. In a second embodiment of the switch, the second support plate has a first array of photo-detectors or photo-diodes aligned with corresponding half of the fixed fibers in their array, and a second array of fibers having focusing termination aligned with the remaining half of the fixed fibers. The armature bearing the common fiber is bifurcated to form a baffle that selectively blocks the light path between one of the fixed fibers and one of the focusing fibers in the second array. With such a switch configuration, a monitoring system that can monitor both fibers in a transmit-receive pair from one end of the fiber path can be constructed. Such monitoring system is shown and described in the aforementioned Mock patent application Ser. No. 08/651,945, pending.

The switch of the invention makes possible real time optical power monitoring in addition to continuing to function as a "traditional" 1×N optical switch, and also makes possible system independent test and surveillance architecture. Fault location time can be materially reduced using the present switch, regardless of system architecture, while maintaining economic feasibility.

DESCRIPTION OF THE DRAWINGS

FIG. 2 is a block diagram of a monitoring circuit utilizing the switch of FIG. 1;

FIGS. 3A and 3B are details of modified components of the switch of FIG. 1 for use in a particular monitoring arrangement;

DETAILED DESCRIPTION

Figure 1:
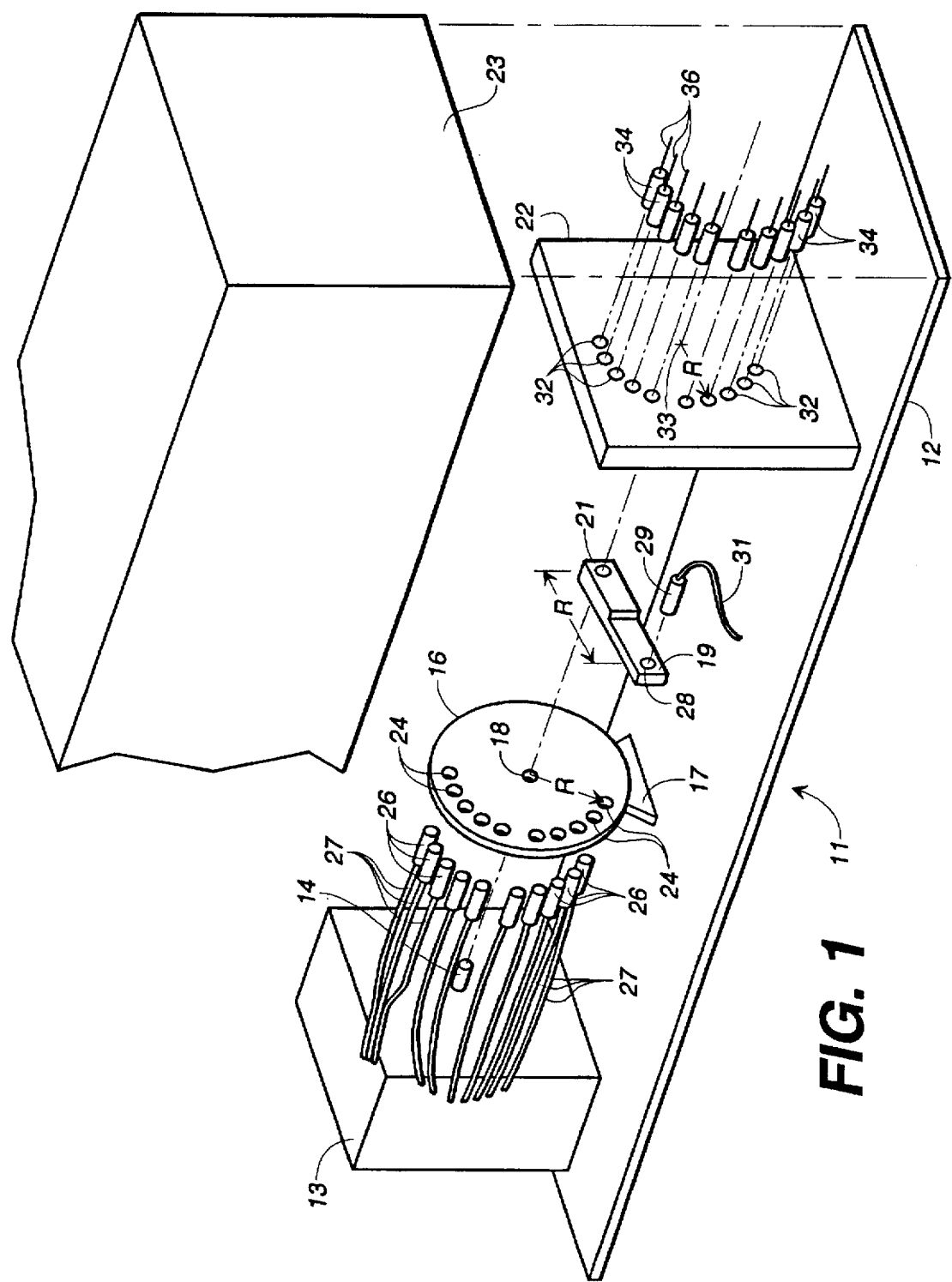
FIG. 1 is an exploded perspective view of the switch of the invention in a first embodiment thereof.
Figure 4:
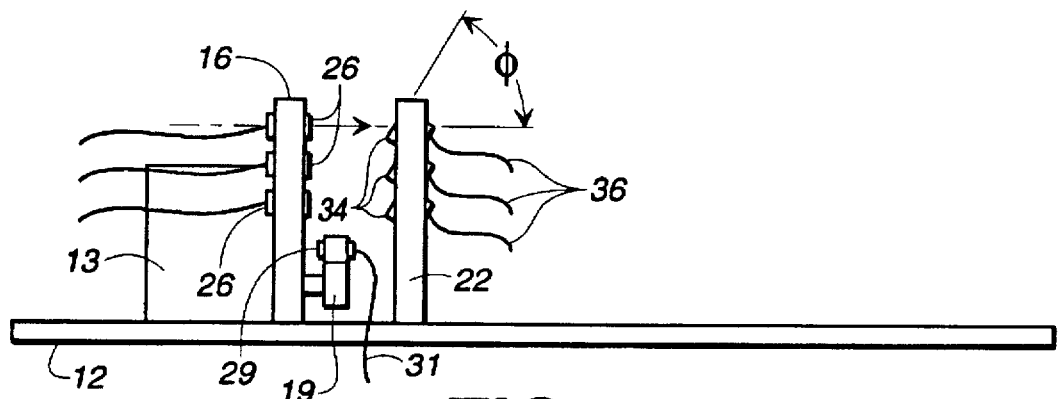
FIG. 4 is a detail of another modification of one of the components of the switch of FIG. 1.

In FIG. 1 there is depicted a first embodiment of the switch 11 of the invention which comprises a base member 12 which is shown as a metal sheet, but which may take any of a number of forms. Mounted on member 12 is an electrical step motor 13 having an axially extending rotatable shaft 14. A support plate 16 is mounted on member 12 and affixed thereto by suitable means 17 which may take any of a number of forms, or plate 16 may be directly bolted or otherwise affixed to member 12. Support plate 16, shown in FIG. 1 as being circular, but amenable to any number of configurations, has a bore 18 which is axially aligned with shaft 14, and through which shaft 14 extends. An armature 19 has a bore 21 for receiving shaft 14 in, for example, a press fit, although other means for attaching armature 19 to shaft 14, such as a flat on shaft 14 and a set screw on armature 19, might readily be used. A second support plate 22, axially spaced from support plate 16, is affixed to member 12 by any suitable means. The entire switch assembly is preferably enclosed by a suitable cover 23 which primarily functions as a protective cover, but also functions to block extraneous or ambient light from reaching the switch components.

Support plate 16 has, in the configuration shown in FIG. 1, a semi-circular array of bores 24 into which are affixed a plurality of individual fiber terminations 26 and the accompanying fibers 27. Fiber terminations 26 are preferably of the type known as Grin-rod lenses, which, as will be apparent hereinafter, are preferably of the collimating type, so that the light emerging therefrom is, in effect, a narrow beam. The individual fibers 27 are connected through directional couplers or WDMs or other suitable coupling means to the individual fibers in a cable to be monitored, as will be discussed more fully hereinafter, and the lenses 26 emit a collimated beam from each of the fibers 27 which are active, or carrying light energy.

Armature 19 has a second bore 28 therein, spaced from bore 21 a distance R. Each of the bores 24 in plate 16 is spaced from the center of bore 18 the same distance R. Thus, when armature 19 is rotated in steps, bore 28 coincides with each opening 24 in turn. Mounted in bore 28 is a Grin-rod lens focusing fiber termination 29, with the lens having an expanding pattern to insure capturing the collimated light emerging from the terminations 26 and directing it along a single fiber 31. As will be apparent hereinafter, Grin-rod type lenses may be used to produce either a collimation or expansion of the light beam. The term "focus" is intended to include either of such effects. In operation, as armature 19 is stepped through an arc by step motor 13, the light emerging from each termination 24 is directed, in turn, along the fiber 31. In order that losses be minimized, the face of armature 19 adjacent the face of plate 16 is spaced therefrom a small distance such as, for example, 0.03125 inches, which insures free movement of armature 19 relative to plate 16 while minimizing loss.

Plate member 22 has a semi-circular array of individual bores 32 radially spaced from a center point 33 the distance R and circumferentially spaced from each other so that each bore 32 is axially aligned with a corresponding bore 24 in plate 16. Point 33 is located along the longitudinal axis which includes shaft 14, bore 18, and bore 21 in armature 19. Mounted in each bore is a light device 34 which, as pointed out heretofore, is in the present embodiment a photo-detector. As will be apparent hereinafter, light devices 34 may take any of a number of forms other than photo-detectors, performing different functions, depending upon the use to which the switch of the invention is put. Each device 34 has an output lead 36 which generally is an electrical conductor and which is directed to other components of the system in which the switch 11 is used. In operation, the collimated light energy emerging from each lens termination 26 is received or detected by the corresponding photo-detector 34 except for the particular termination 26 that happens to be blocked by armature 19 and termination 29. Although it is not strictly necessary, it is preferable that each device 34 have a lens having an expanding pattern upon which the collimated light beam from the corresponding termination 26 impinges to insure greater light beam capture. Armature 19 preferably has a home or reset position where it does not block any of the bores 24. Such a position is indicated by the dashed lines in FIG. 1, and can be, for example, the lowermost counter-clockwise travel position of armature 19.

The switch of the invention is adaptable to a wide variety of functions and uses, as is apparent from the aforementioned co-pending Mock application Ser. No. 08/651,945, pending. In FIG. 2 there is shown, in block diagram, a monitoring circuit utilizing the switch 11 of FIG. 1 which provides real time surveillance and monitoring of an optical fiber transmission system, and also enables rapid location of a fault in one or more of the fibers in a cable, when such fault occurs.

The arrangement of FIG. 2 comprises a system for testing the individual fibers in a transmission cable, designated generally as 40, for example, only a portion of one fiber 37 being shown, adjacent or in proximity to the receiver 38. The fiber 37 passes through a wave division multiplexor (WDM) 39 or other suitable type of signal divider, which launches a potion of the optical energy on fiber 37 onto one of the fibers 27 of switch 11. Each of the fibers in the cable will have its own WDM or the equivalent thereof. As pointed out hereinbefore, signal transmission generally requires two fibers, i.e., transmit/receive or go/return, hence, at the other end of the cable there will be similar WDMs 39 and switches 11 for the other fiber of each pair. The fibers 27 terminate in collimating terminations 26 as discussed hereinbefore, and the light emitted therefrom is captured and detected by the corresponding photo-detectors 34 as explained in the foregoing. The outputs of the photo-detectors are applied through leads 36 to a CPU 39 which may take any of a number of forms for measuring the signal strength on each of the leads 36, preferably independently. The output, or an output, of the CPU is applied through lead 41 to an OTDR 42, and the optical output of the OTDR is directed by the common fiber 31 to the armature 19.

In operation, assuming all of the fibers 37 in cable 40 are carrying optical signals, there is a light output from each of the terminations 26 which is focused onto the corresponding photo-detectors 34, whose electrical outputs are applied to CPU 39. Thus the CPU can give, in one form or another, an indication that the system is functioning properly, and the OTDR 42 is idle. When an event such as a break occurs on a fiber 37, its particular signal does not reach its WDM 39, and hence, does not reach the corresponding fiber termination 26. As a consequence, the corresponding photo-detector 34 does not generate a signal since no light impinges thereon, and its normal signal to the CPU 39 is cut off. The CPU 39 notes the loss of a signal, and is programmed to identify which particular photo-detector 34 and hence, which particular termination 26 and fiber 27 are without signal, and activates stepping motor 13 which moves armature 19 in steps to the termination 26 which lacks a signal. The CPU then activates the OTDR to launch a fault finding signal onto the fiber 31 and hence on to the fiber 27 which passes through the WDM 39 and is directed toward the transmitter end of cable 40. As explained hereinbefore, the reflected OTDR signal, which is fed back into the CPU 39 gives an indication of the distance along the fiber 37 to the fault. Thus, the switch 11 of the invention affords a simple, real time monitoring arrangement which, in conjunction with the other components of the circuit of FIG. 2, makes possible extremely rapid fault detection and fault location. In addition, in the circuit arrangement to FIG. 2, the optical level measurements are made independently of the mechanical integrity of the switching mechanism. Thus, a switch failure due, for example, to a fault on the stepping motor will not cause a failure of the channel monitoring operation of the photo-diode. Also, the switch of FIG. 1 in the circuit of FIG. 2, for example, can be used to indicate the physical status of the armature 19. When the armature 19 is moved to a particular position the energy that normally impinges on the corresponding photo-diode is blocked by the common fiber termination 29. Thus, the signal emerging from the termination 26 is captured by the termination 29 and then may be used to provide a positive feedback mechanism that indicates the actual position of the switch. The switch 11 is, therefore, capable of testing its own mechanical as well as optical integrity.

In FIGS. 3A and 3B there is shown a modification to the switch 11 of FIG. 1 which adapts the switch for use in certain monitoring arrangements other than that shown in FIG. 2, which are disclosed in the aforementioned co-pending application of Joel Mock. In the arrangement of FIG. 3A, the plate 16 has two discrete sets of bores, the first set containing the terminations 26, connected to the receive fibers and which function as previously described, and the second set preferably comprising a second array of an equal number of terminations 43 which can be the same as terminations 26, but which are connected to the transmit fibers of each of the fiber pairs. Plate 22 likewise has two arrays, the first having photo-diodes 34 opposite the Grin-rod terminations 26, and the second array having fixed Grin-rod lens terminations 44 which are opposite the array of Grin-rod termination 43. Instead of the armature 19 of FIGS. 1 and 2, the modified switch of FIGS. 3A and 3B has a bifurcated armature 46 having first and second arms 47 and 48. The spacing of arms 47 and 48, i.e., their angular orientation relative to each other, is such that when arm 47, which carries the single fiber termination 34 is positioned in front of one of the receiving fibers in the first array, arm 48 blocks the termination 43 of the corresponding transmit fiber. As will be apparent from the more detailed description of the monitoring circuit for which the modified switch of FIGS. 3A and 3B is to be used, as set forth and described in the co-pending Joel Mock application, the photo-diodes or detectors 34 preferably are equipped with filters which make them responsive to a test frequency, for example, rather than the normal signal transmission frequency. The armature 46 can also be stepped further to bring arm 47 in front of the transmit fibers also so that further fault locating steps may be performed, as discussed in detail in the aforementioned co-pending application Ser. No. 08/651,945, pending. The modification comprises an angular orientation of the photo-detectors or other light devices 34 at an angle Ø to the direction of the light emerging from the elements 26. It has been found that an angle Ø equal to 87° (or 3° from the vertical) is adequate for redirecting reflections from the faces of the elements 34 which otherwise might be directed back toward elements 26. While 87° has been found to be adequate, other values of Ø might be used to archive the desired result.

Figure 5:
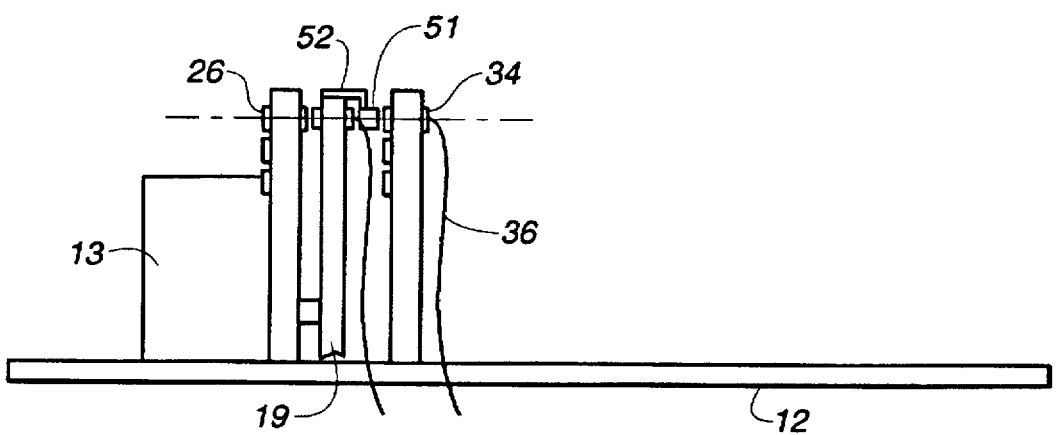
FIG. 5 is a partial diagrammatic elevation view of another embodiment of the invention.
Figure 6:
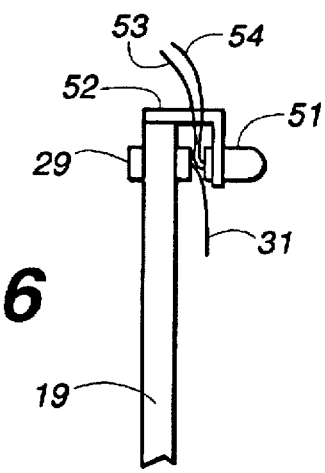
FIG. 6 is a detail of the embodiment of FIG. 5.

The modification of switch 11 shown in FIGS. 5 and 6 enables the switch to function to serf test the photo-detectors 34 and the associated circuitry to which they may be connected, such as the CPU 39 or other power measuring circuitry. As can be seen in FIGS. 5 and 6, an optical source 51 is mounted on armature 19 by suitable mounting means such as bracket 52. Source 51, which may have a light emitting diode, laser diode or other suitable light emitting means, is axially aligned with fiber termination 29, and is supplied with suitable activating voltage by leads 53 and 54. It is thus axially aligned with each of the photo-detectors 34 in turn, depending on the position of armature 19, and when activated, illuminates the particular photo-detector with which it happens to be aligned. Source 51 is preferably optically shrouded or shielded so that the optical energy fails on only that particular photo-detector. In operation, the circuitry connected to any particular photo-detector, and the photo-detector itself may be individually tested while the remaining photo-detectors 34 continue to function in the manner explained hereinbefore. The armature 19 and member 29 and 51 block the light energy emerging from the corresponding termination element 26 while the corresponding photo-detector and associated circuitry and components are being tested. The arrangement of FIGS. 5 and 6 also function as a check on fault monitoring in that when the CPU receives no signal from a particular channel, as defined by each fiber 27 and its associated switch components, the armature 19 is stepped to that particular channel and light source 51 gives an immediate indication that the photo-detector and associated circuitry are working properly, hence the fault lies somewhere in the cable and location procedures are then begun.

The switch of the present invention is applicable to various arrangements where N can have a value of one, ten, twenty-four, or any number of fibers that the physical dimensions can accommodate. As is apparent from the foregoing, the switch is also adaptable to a wide variety of uses, some of which are disclosed in the aforementioned Joel Mock co-pending application Ser. No. 08/651,945, pending. It is also possible that the armature 19 have more than one termination 29 mounted thereon for special applications of the switch to produce a 2×N switch of an M×N switch.

In conclusion, it should be noted that it will be obvious to those skilled in the art that many variations and modifications may be made to the preferred embodiment without any substantial departure from the principles of the present invention. All such variations and modifications are intended to be included herein as being within the scope of the present invention as set forth in the claims. Further, in the claims set forth hereinafter, the corresponding structures, materials, acts and equivalents of all means or step-plus-function elements are intended to include any structure, material, or acts for performing the functions in combination with other claimed elements as specifically set forth in the claims.

I claim:

1. An optical switching device comprising:
   a base member;
   a first optical fiber having a first light emitting and receiving termination on an end thereof mounted in fixed position relative to said base;
   a light device fixedly mounted relative to said base and spaced from said first termination and substantially aligned therewith to establish a fixed light path between said first termination and said light device; and
   means for interrupting the light path comprising a second optical fiber having a second light emitting and receiving termination on an end thereof and means for moving said second termination into alignment with said first termination between said first termination and said light device.

2. An optical switching device as claimed in claim 1 wherein said first termination includes a light focusing means.

3. An optical switching device as claimed in claim 1 wherein said light device is a photo-detector responsive to light energy emitted from said first termination.

4. An optical switching device as claimed in claim 3 wherein said photo-detector has an angular orientation relative to the direction of light energy from said first fiber termination.

5. An optical switching device as claimed in claim 1 wherein there is a plurality of first optical fibers spaced from each other with the first terminations thereof defining a first planar array substantially parallel to the plane of movement of said second termination.

6. An optical switching device as claimed in claim 5 wherein said means for moving said second termination comprises a stepping motor.

7. An optical switching device as claimed in claim 6 wherein said stepping motor is adapted to move said second termination into substantial alignment with each of said first terminations in said planar array.

8. An optical switching device as claimed in claim 5 wherein there is a plurality of light devices spaced from each other and defining a second planar array substantially parallel to said first planar array, each of said light devices being substantially aligned with a corresponding first termination in said first planar array.

9. An optical switching device as claimed in claim 8 wherein said second planar array has a first group of photo-diodes therein and a second group of fiber terminations therein.

10. An optical switching device as claimed in claim 9 wherein each of said fiber terminations of said seconds group has means for focusing light energy emerging therefrom in a direction toward said fiber terminations of said first array.

11. An optical switching device as claimed in claim 10 wherein said means for moving said second termination includes means for blocking the light path between a first termination and corresponding fiber termination of said second group aligned therewith.

12. An optical switching device as claimed in claim 8 wherein said means for moving said second termination has a light source mounted thereon in alignment with said second termination for directing light energy toward said light devices.

13. An optical switching device comprising:
   a first planar support member having a first array of bores therein and a central bore spaced therefrom, said support member being mounted on a base member;
   a plurality of optical fibers each having a first termination thereon, each of said terminations being mounted in one of said bores;
   a motor having a shaft extending through said central bore and free to turn with respect to said first support member;
   an armature member affixed to said shaft and rotatable in a plane adjacent to and spaced from said first planar support member and parallel thereto;
   said armature member having an optical fiber having a second termination thereon which is mounted to said armature member and spaced from the point where said armature is affixed to said shaft a distance substantially equal to the spacing of said central bore from each of the bores of said first array;
   a second support member affixed to said base member and spaced from said first support member and said armature; said second support member having a second array of bores therein, each of said bores in said second array being substantially aligned with a corresponding bore in said first array; and
   a light device mounted in each of the bores of said second array defining a light path between the first terminations and said light devices.

14. An optical switching device as claimed in claim 13 wherein at least some of said light devices are photo-detectors.

15. An optical switching device as claimed in claim 13 where at least some of said light devices are optical fiber terminations.

16. An optical switching device as claimed in claim 13 wherein said optical devices comprise a first group of light devices of a first type and a second group of light devices of a second type different from said first type.

17. An optical switching device as claimed in claim 16 wherein said armature has first and second arms oriented at an angle to each other, said second termination being mounted to said first one of said arm.

18. An optical switching device as claimed in claim 17 wherein said first array is divided into first and second groups of bores with fiber terminations and said second array is divided into first and second groups of bores with optical devices.

19. An optical switching device as claimed in claim 18 wherein the angle between said first and second arms is such that when said second termination is aligned with a first termination in the first group of said first array, the second arm of said armature blocks the light path between a first termination in said second group of said first array and the corresponding optical device in said second group of said second array.

20. An optical switching device as claimed in claim 13 wherein at least some of said light devices in said bores defining said second array are mounted at an angle to the light path between corresponding bores in said first and second arrays.

21. An optical switching device as claimed in claim 20 wherein each of said light devices in said second array of bores has a light receiving face oriented at appropriate eighty-seven degrees to the direction of the light path.

22. An optical switching device as claimed in claim 13 and further including a light emission device mounted to said armature substantially co-axial with said second termination.

23. An optical switching device as claimed in claim 22 wherein said light emission device is a light emitting diode.

24. An optical switching device as claimed in claim 22 wherein at least some of said optical devices in said second array of bores are photo-detectors responsive to the light from said light emission device.

25. An optical switching device as claimed in claim 13 and further including cover means for enclosing said switching device.

* * * * *